Figure 1:
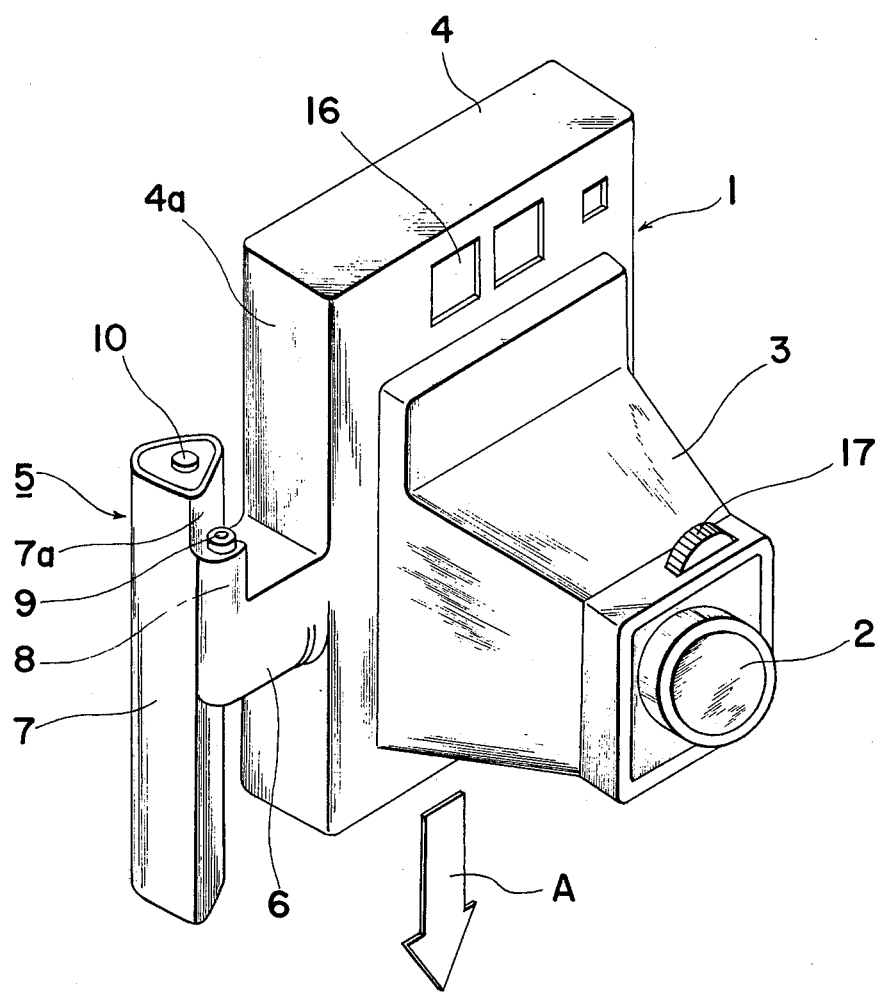

United States Patent [19]
Goto

[11] 3,988,751
[45] Oct. 26, 1976

[54] GRIP MEANS FOR AUTO-PROCESS CAMERA

[75] Inventor: Toshio Goto, Omiya, Japan

[73] Assignee: Fuji Photo Film Co., Ltd., Minami-ashigara, Japan

[22] Filed: June 2, 1975

[21] Appl. No.: 583,223

[30] Foreign Application Priority Data

June 6, 1974 Japan............................. 49-64783

[52] U.S. Cl............................. 354/82; 354/83; 354/173; 354/288
[51] Int. Cl.² ...................................... G03B 29/00
[58] Field of Search ........................... 354/81–83, 354/90, 170, 173, 293, 295, 288

[56] References Cited
UNITED STATES PATENTS

| | | | |
|---|---|---|---|
| 2,472,823 | 6/1949 | Harlow | 354/170 |
| 3,678,832 | 7/1972 | Dietz et al. | 354/82 X |
| 3,820,148 | 6/1974 | Osanai | 354/82 X |

FOREIGN PATENTS OR APPLICATIONS 37-2230  5/1962  Japan .............................. 354/173

*Primary Examiner*—John Gonzales
*Attorney, Agent, or Firm*—Sughrue, Rothwell, Mion, Zinn & Macpeak

[57] ABSTRACT

A grip means for an auto-process camera which comprises a base tube portion fixed to a side of a camera at approximately right-angles thereto, and a main tube portion aligned at approximately right-angles to the other end of the base tube portion in integral connection to the latter for easy gripping in the hand. Inside the base tube portion, there is provided a motor or the like for actuation of the driving mechanisms in the camera, while the main tube portion accommodates batteries or other power supply source.

2 Claims, 2 Drawing Figures

GRIP MEANS FOR AUTO-PROCESS CAMERA

The present invention relates to a camera and, more particularly, to a grip means for an auto-process camera having provided therein a drive means for effecting developing and processing of diffusion type film units each including a photosensitive sheet which has been exposed to image light in the camera, and for directing processed film units to the exterior of the camera.

Conventionally, there is known a photographic process, frequently referred to as 'auto-process', according to which film is provided not in roll form but in the form of individual units each of which comprises at least a negative image layer and a transfer image layer and has associated therewith processing solution contained in breakable pods, which are usually embedded in an edge portion of the film unit. The negative image layer is exposable to form a negative or latent image of an object, and a corresponding, viewable image may be formed on the transfer image layer under the influence of the processing solution, which is extruded from the pods and spread through the film unit under the action of pressure means between which the film unit is passed subsequent to exposure, which pressure means are conveniently provided, for example, as a pair of processing rolls mounted inside the associated auto-process camera for also acting to move the film unit to the exterior of the camera, whereby a finished photographic print may be made available to a photographer in a very short time after a film unit is exposed, without it being necessary for the photographer to proceed to a separate, specially equipped location for development and processing of film.

For driving such processing rolls, however, considerably a large drive output is necessary. The drive output may be supplied by an electric motor or a coil-spring motor means, either of which is required to be larger in size than motor means provided in a so-called 8 millimeter cinecamera or the like, for example, and presents problems with respect to location thereof within a camera.

In addition to this, the camera body must be made large because of characteristics of film units employed, and the manner in which the camera is held during taking of a photograph is different from that employed for normal, smaller-type cameras, and it has been a desideratum to make it possible for a photographer to be able to firmly grip an auto-process camera and while thus holding the camera, to be able to actuate the camera without difficulty. A particular requirement of auto-process camera construction is that it be possible to support the camera without risk of the hand or hands obstructing a processed film unit which is automatically ejected from the camera subsequent to taking of a photograph.

Accordingly, an essential object of the present invention is to provide grip means for an auto-process camera which simultaneously resolves constructional problems relating to camera support and problems of location of motor means.

Another important object of the present invention is to provide grip means of the above described type which permits holding of a side portion of the camera and may be firmly gripped with the right hand, for example, thereby leaving the left hand free to perform focussing or other camera operations and which comprises a mount portion accommodating motor means, such as an electric motor for example, for actuation of drive means in the camera, and a main portion accommodating means for supply of power to the motor means.

A further object of the present invention is to provide grip means of the above described type which is provided with a shutter button that may be depressed by the thumb or index finger of the hand holding the grips means and which, when so depressed, causes the drive means to be actuated by the motor means.

There is provided according to the invention a grip means comprising a base tube portion which is fixed to a side of a camera, at approximately right-angles thereto, and a main tube portion which is aligned at approximately right-angles to, and is in integral connection to the other end of the base tube portion, and is shaped to permit easy gripping thereof in the hand, the grip means having the approximate shape of the letter T. Inside the base tube portion, there is provided motor means, such as an electric motor, etc., which connects to a gear of and may actuate a drive means mounted inside the camera body, while the main tube portion accommodates batteries or other power supply means.

The abovementioned further object of the invention is achieved by the provision on the grip means, for example on an upper portion of the main tube portion, of a shutter button, which when depressed causes the power supply means to be connected to the motor means.

Figure 2:
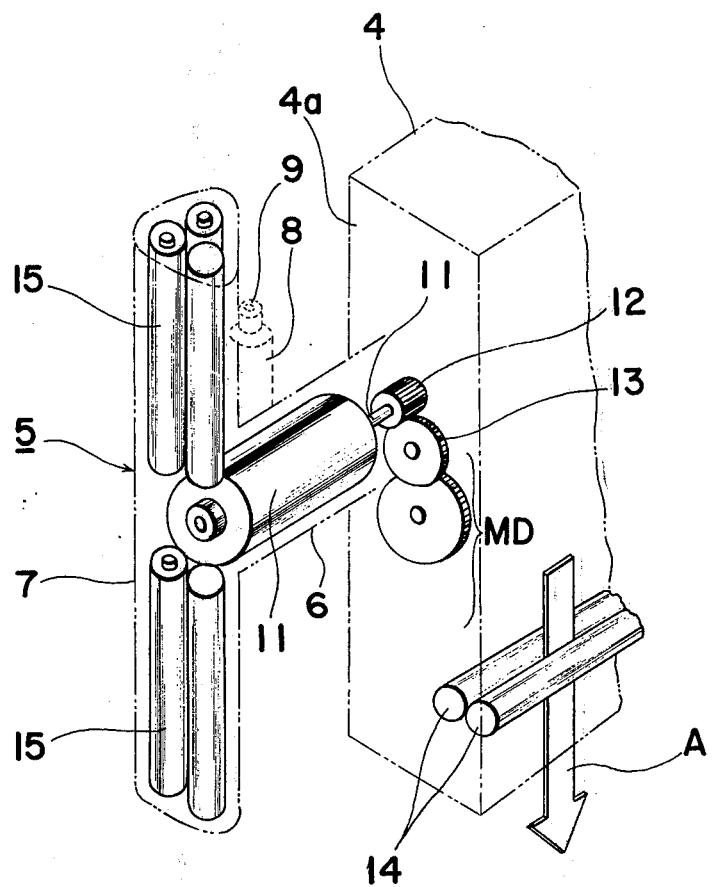

These and other objects and features of the present invention will become apparent from the following description taken in conjunction with the preferred embodiment thereof with reference to the accompanying drawings, in which:

FIG. 1 is a perspective view of a camera in illustration of a grip means according to one embodiment of the invention, and FIG. 2 is an explanatory view of main internal elements of the grip means of FIG. 1.

Before the description of the present invention proceeds, it is to be noted that like parts are designated by like reference numerals throughout the accompanying drawings.

Referring to FIG. 1, there is schematically shown an auto-process camera 1 comprising a lens 2 supported in a lens mount 3 whose base portion is mounted on the front wall of the camera main body 4 of box-like configuration. To a generally central portion of one side wall of the camera main body 4, which is the left-hand side wall 4a thereof as seen in the drawing, there is fixed a grip means 5 according to the invention.

The grip means 5 comprises a base tube portion 6 which extends at approximately right-angles to, and has one end in integral attachment to a generally central portion of the side wall 4a, and a grip tube portion 7 which is integrally attached to the opposite end of, and is aligned at approximately right-angles to the base tube portion 6. The grip tube portion 7 is thus approximately parallel to the side wall 4a and externally the grip means 5 has the general shape of the letter T.

The grip tube portion 7 is of convenient shape and size to permit firm gripping or support thereof with the hand. Extending approximately vertically upwards from the junction of the base tube portion 6 and the grip tube portion 7, there is a small diameter tube portion 8 which is in integral attachment to the side surface 7a of the grip tube portion 7 facing the camera main body, and at the top of which there is mounted a projecting shutter button 9.

As shown in FIG. 2, in the space defined by the base tube portion 6, there is accommodated an electric motor 11 whose axis is disposed at right-angles to the camera side wall 4a, and which is for actuation of a motor-drive means provided in the camera. The terminal portion of the output shaft 11a of the motor 11 is supported in such a manner that it extends into the camera main body, and has mounted thereon a drive gear 12. The drive gear 12 engages a transmission gear 13 which constitutes part of the camera motor-drive means MD, which is not shown in detail in the drawing.

When actuated by the motor 11, the motor-drive means MD causes a film unit, not shown, which includes a photosensitive layer that has been exposed, to be moved into engagement with a pair of processing rolls 14, which are provided in a lower portion of the camera main body, and which, while the film unit is passed therebetween, apply pressure to break open processing solution pods associated with the film unit, and to spread processing solution in a layer throughout the film unit, the film unit being moved downwards as indicated by the arrow A in the drawing, and the processed film unit being subsequently moved by the drive means MD to the exterior of the camera, through an exit, not shown, in the camera bottom wall.

A predetermined number of batteries 15 constituting a power supply are housed in the space defined inside the grip tube portion 7 of the grip means 5. Upon depression of the shutter button 9, the main switch of an electronic control circuit, not shown, which is provided in the camera main body 4 and controls action of the motor-drive means MD, is closed, and electrical power is supplied from the batteries 15, and the motor 11 is started, at a command signal given by the electronic control circuit.

As shown in FIG. 1, on top of the grip tube portion 7, there may be provided a knob-fitted cover 10, which is openable and closeable, and which may be opened to permit exchange of the batteries 15.

Still referring to FIG. 1, the grip means 5 can be firmly held in the right hand of a photographer not shown, and thus permits support of the camera 1. The photographer may therefore use his or her left hand to turn the focus adjustment gear 17 provided on the lens mount 3 adjacent to the lens 2, in order to focus the camera while looking through the camera viewfinder 16 provided on the upper portion of the camera main body 4, and then depress the shutter button 9 with the thumb or index finger of the right hand. A set time after depression of the shutter button 9, the motor-drive means MD is actuated, and a processed film unit is fed out through the bottom of the camera main body 4, the film unit being moved out of the camera by the processing rolls 14 without any hindrance whatsoever by the photographer's hands. The terminal end portion of the film unit is held in the bottom of the camera to prevent the film unit from falling, after which it is simply necessary to withdraw the film unit, which may be done with the left hand.

As described above, according to the present invention motor means for actuation of motor-drive means of an auto-process camera and batteries or other power supply means are housed within a grip means having a base portion fixedly attached to a side portion of the camera main body.

According to the invention, since it is possible to support an auto-process camera with one hand, the other hand is free to adjust focus or effect other camera operations. Also, since the camera may be held securely and steadily, problems of shaking, or blurr, etc., may be avoided.

By housing motor means for actuation of a drive means in spare space inside a grip means base portion, mounting of the motor-drive means in the actual camera body is made easier, and provision of batteries in the held portion of the grip means facilitates replacement of the batteries. Alternatively, the grip means may house a means for conversion of an external alternating current power supply to direct current, and so may be used in association with a camera using AC power supply.

Furthermore, because the grip means of the invention is fixed to a side wall of a camera, there is no obstruction to exit of film units, if film units are ejected through the bottom of the camera.

The invention also contributes to simplifying actions necessary for taking photographs with these types of auto-process camera since the camera shutter button may be mounted on the grip means and depressed by the thumb or index finger of the hand holding the grip means.

Needless to say, although the motor means in the embodiment above was described as an electric motor, it is equally possible to employ a conventionally known coil-spring means. In this case the coil-spring container may be contained in the grip means base portion 6, and to effect wind-up of the coil-spring, there may be provided a construction whereby the tube portion 7 may be grasped and the whole tube portion 7 may be turned several times, with the base portion 6 acting as a pivot shaft, and tighten the coil-spring while being turned. Thus, it is possible to locate a coil-spring, which requires a comparatively large amount of space, outside the main portion of a camera, and there is also the advantage that the full strength of the wrist may be employed to wind up the coil-spring.

Gear trains, etc., for transmission of drive, at the output end of the coil-spring shaft may be in a motor drive arrangement or have another construction that is conventionally known.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. In an auto-process camera including a main body having provided therein drive means for successively and automatically performing a series of actions including moving film, which is in the form of a sheet comprising at least a photosensitive layer, and has been exposed to image light at an exposure station, whereby said film constitutes a film unit for formation of an image by diffusion-transfer process, causing said film unit to pass between processing rolls, and directing said film unit after diffusion-transfer processing thereof to the exterior of said camera, the improvement comprising: hand grip means for the auto-process camera including a base tube portion having one end fixedly attached to a side of said main body of said camera at right angles thereto, motor means mounted within said base tube portion having an output shaft extending co-axially with said tube towards said body, gear means carried by said camera body constituting part of said drive means and engaging said motor output shaft, said grip means further comprising a grip tube portion which is integral with said base tube portion at the opposite end of said base tube portion from said camera body, and said grip tube portion defining a space for accommodation of a power supply means for actuation of said motor means, and being of a form permitting holding thereof in the hand.

2. An auto-process camera as claimed in claim 1, further comprising a shutter button carried by said grip tube portion and being operably connected to said power supply means and said motor means.

* * * * *